United States Patent
Scolan

(10) Patent No.: US 9,783,719 B2
(45) Date of Patent: Oct. 10, 2017

(54) METHOD OF TREATMENT OF OUTDOOR EQUIPMENT WITH A POLYSACCHARIDE COATING

(71) Applicant: CSEM Centre Suisse d'Electronique et de Microtechnique SA, Neuchatel (CH)

(72) Inventor: Emmanuel Scolan, Neuchatel (CH)

(73) Assignee: CSEM CENTRE SUISSE D'ELECTRONIQUE ET DE MICROTECHNIQUE SA RECHERCHE ET DEVELOPPEMENT, Neuchatel (CH)

(*) Notice: Subject to any disclaimer, the term of this patent is extended or adjusted under 35 U.S.C. 154(b) by 206 days.

(21) Appl. No.: 14/751,773

(22) Filed: Jun. 26, 2015

(65) Prior Publication Data
US 2015/0376483 A1    Dec. 31, 2015

(30) Foreign Application Priority Data
Jun. 27, 2014 (EP) ..................... 14174833

(51) Int. Cl.
*B32B 9/00* (2006.01)
*C09K 3/18* (2006.01)
(Continued)

(52) U.S. Cl.
CPC ............ *C09K 3/18* (2013.01); *B05D 1/18* (2013.01); *B05D 3/065* (2013.01); *B05D 5/08* (2013.01); *B64D 15/00* (2013.01); *C09D 105/00* (2013.01)

(58) Field of Classification Search
CPC .............................. C09D 105/00; B64D 15/00
See application file for complete search history.

(56) References Cited

U.S. PATENT DOCUMENTS 4,698,172 A    10/1987 Tye et al.
5,780,148 A *  7/1998 Ohtake ................. B05D 1/185
                                                      427/387
(Continued)

FOREIGN PATENT DOCUMENTS

DE   10 2013 005223 A1   10/2013
EP    1 857 498 A1        11/2007
(Continued)

OTHER PUBLICATIONS

Jing Chen et al., "Robust Prototypical Anti-icing Coatings with a Self-Lubricating Liquid Water Layer between Ice and Substrate," American Chemical Society Applied Materials & Interfaces 2013, 5, pp. 4026-4030.
(Continued)

*Primary Examiner* — Margaret Moore
(74) *Attorney, Agent, or Firm* — Young & Thompson

(57) ABSTRACT

A method of treatment of outdoor equipment for reducing ice adhesion thereon, the outdoor equipment defining a substrate on which a layer of linkers is intended to be coupled, the linkers being bi-functional and including: a first reacting group able to couple in a stable way in environmental conditions with the substrate, and a second reacting group able to generate a covalent bond stable in environmental conditions with polysaccharides, the method includes the steps of: coupling the linkers on at least an area of the equipment to obtain a layer of linkers coupled stably in environmental conditions with the substrate; and making react some polysaccharides on the layer of linkers to bind them with a covalent bond stable in environmental conditions with the second reacting group of the linkers and forming a layer of polysaccharides on the layer of linkers.

10 Claims, 1 Drawing Sheet

(51) Int. Cl.
  B64D 15/00   (2006.01)
  C09D 105/00  (2006.01)
  B05D 1/18    (2006.01)
  B05D 3/06    (2006.01)
  B05D 5/08    (2006.01)

(56) References Cited

U.S. PATENT DOCUMENTS

| | | | |
|---|---|---|---|
| 2012/0006222 A1* | 1/2012 | Dopico | C09K 3/185 106/13 |
| 2014/0142292 A1* | 5/2014 | Shimada | C09K 3/18 536/93 |
| 2015/0079291 A1 | 3/2015 | Schaller et al. | |

FOREIGN PATENT DOCUMENTS

| | | |
|---|---|---|
| JP | 2000 279511 A | 10/2000 |
| WO | 2008/071752 A1 | 6/2008 |
| WO | 2009/136186 A1 | 11/2009 |

OTHER PUBLICATIONS

Thomas Congdon et al., "Antifreeze (Glyco)protein Mimetic Behavior of Poly (vinyl alcohol): Detailed Structure Ice Recrystallization Inhibition Activity Study," American Chemical Society Biomacromolecules 2013, 14, pp. 1578-1586.

Raoul Peltier et al., "Synthesis and antifreeze activity of fish antifreeze glycoproteins and their analogues," Chem. Sci. 2010, 1, pp. 538-551.

European Search Report dated Dec. 4, 2014, in corresponding European application.

* cited by examiner

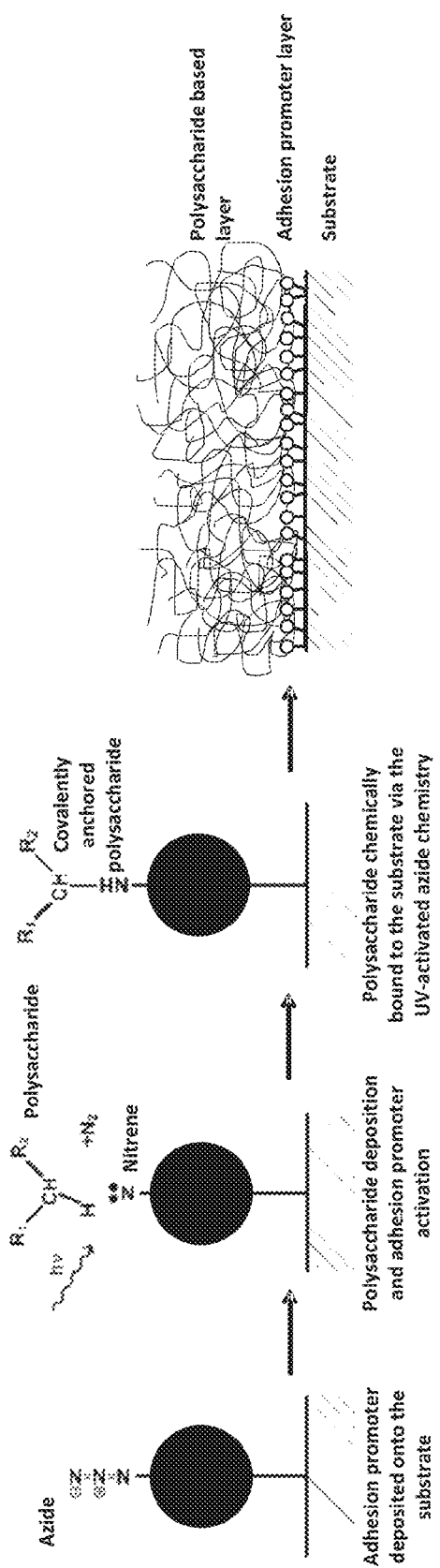

METHOD OF TREATMENT OF OUTDOOR EQUIPMENT WITH A POLYSACCHARIDE COATING

TECHNICAL FIELD

The present invention relates to the field of reduction of energetics and to the field of mechanical engineering. It more particularly relates to a method of treatment of outdoor equipment for reducing ice adhesion on said equipment.

STATE OF THE ART

Ice accretion and its adhesion to structured surfaces are detrimental to modern infrastructures including telecommunications, power lines, offshore platform, roads, windmills and air and ground transportation vehicles. Specifically, the aviation industry has been facing difficulties related to many aspects of flying, such as loss in radar sensitivity, aerodynamic control, and high energy consumption, representing a severe risk for human safety and a significant economic impact on operational costs. When ice builds up on the wings or leading edges of airplanes it may decrease lift force and propulsion efficiency and increase weight and aerodynamic drag, as recently demonstrated by the tragic airplane crash in Buffalo (2009). Ice protection systems are therefore required.

Preventing ice build-up has long been a technological challenge. Ice, with its broad range from snow to glaze, can stick to almost any surface. There have been many attempts to reduce ice adhesion, but fundamental physics of ice adhesion is not well understood yet, requiring in depth modelling. Many de-icing methods have been developed but none of them is fully satisfactory. In fact none fulfils two major requirements for a true solution: (a) high reduction in ice adhesion, and (b) long service-time in environmental conditions.

Traditional approaches rely on mechanical breaking of ice or using chemicals to melt the accreted ice, which are temporary solutions. Moreover, mechanical de-icers may disrupt the air laminar flow around aircraft wings and consequently increase the drag. So the airliners are not keen on using them. There are some effective methods involving the melting of ice by heating (Joule effect or high frequency current), but their energy consumption is very high. Recently, acoustical and vibrational actuators have been investigated.

Although de-icing fluids can be applied to ice-covered structures to eliminate such ice build-ups, these substances can have significant negative environmental impacts. Electrolysis is another approach found to be effective for removing ice from certain surfaces, however it is not yet a practical method. All of these de-icing techniques are employed where there is already some ice formed.

Several types of anti-icing fluids are used to prevent ice build-up on aircraft surfaces, but the durability of protection depends on precipitation conditions and the properties of fluids. Moreover, anti-icing fluids such as ethylene glycol are toxic and environmentally unfriendly.

An alternative way of preventing ice accretion would be making a durable coating, which can reduce or even inhibit ice accumulation rather than eliminating it after accretion. Such coatings are called anti-icing or icephobic materials. Coating any surface with anti-icing materials can be an effective way of reducing/preventing ice accretion. Recently, several coatings for icephobic application have been tested and reported. The most promising results have been observed by the application of superhydrophobic coatings, resulting from the combination of surface hydrophobic chemistry and roughening down to the micro-/nano-scale. Both reduced ice adhesion strength and delayed ice accretion on superhydrophobic surfaces have been reported, their anti-icing performance under different conditions has not yet been adequately and systematically examined. More specifically, erosion resistance potential has not been addressed.

Recent observation of cold water fishes and cold region insects has enabled the identification of antifreeze proteins (AFPs) in their body fluids. Due to their strong affinity/adsorption to water, these AFPs inhibit the ice growth and even the ice nucleation. AFPs are commercially available but remain very costly to be directly used for large area coatings, such as those needed for aircraft part coverage. Therefore, synthetic hydrophilic materials mimicking the AFPs behaviour are very promising (e.g. polyacrylic acid hydrogel in ACS Appl. Mater. Interfaces 2013, 5, 4026-4030; synthetic AFPs in Chem. Sci. 2010, 1, 538-551; polyvinyl alcohol in Biomacromolecules 2013, 14, 1578-1586). In this respect, U.S. Pat. No. 8,202,620 patent describes a coating made of complex synthetic—and therefore probably costly—block-copolymer chains with a comb-like structure: a hydrophobic main chain with hydrophilic side chains. The dispersed block-copolymers are deposited on a metallic or glass surface with chemical or physical interactions. This coating is claimed to be 'permanent', but no value of shelf-life or environmental resistance result is reported. Nevertheless, physical and some chemical interactions are hydrolysis sensitive. Moreover, the anti-icing behavior is claimed to be effective at temperatures down to −10° C. only, which is too high compared to most outdoor application requirements, such as wind turbines or aircraft for instance.

The present invention aims to propose a new method of treatment of outdoor equipment in order to limit ice accumulation on such equipment. The invention also concerns equipment comprising a coating obtained by a treatment according to the invention.

DISCLOSURE OF THE INVENTION

More precisely, the invention concerns a method of treatment of outdoor equipment for reducing ice adhesion on said device, said outdoor equipment defining a substrate on which a layer of linkers is intended to be coupled, said linkers being bi-functional and comprising:
  a first reacting group able to couple with the substrate in a stable way in environmental conditions, and
  a second reacting group able to generate a covalent bond stable in environmental conditions with polysaccharides.

The method of the invention comprises the steps of:
  coupling said linkers on at least an area of the equipment to obtain a layer of linkers coupled in a stable way with the substrate,
  making react some polysaccharides on the linkers layer to bind them with a covalent bond stable in environmental conditions with the second reacting group of the linkers and forming a layer of polysaccharides on the layer of linkers.

The invention also concerns outdoor equipment treated by the method according to the invention. Said equipment defines a substrate and comprises:
  a layer of linkers coupled stably in environmental conditions to the substrate, a layer of polysaccharide covalently and stably in environmental conditions bonded to the layer of linkers.

BRIEF DESCRIPTION OF THE DRAWINGS

Some details of the invention will be understood more clearly by reading the following description, provided in reference to enclosed FIG. 1, illustrating the method according to the invention.

EMBODIMENT OF THE INVENTION

As stated above, the present invention aims to reduce ice adhesion on outdoor equipment, which can be exposed to icing conditions, such as, for example, an aircraft wing, telecommunications or power lines, photo-voltaic cell, off-shore platform, roads, windmills and air and ground transportation vehicles. Contrary to the main stream of recent development, the purpose of the invention is not to avoid ice growth, but to promote ice gliding on the substrate by creating a film of liquid water between the substrate and the layer of ice, more precisely between a coating coated on the substrate and the layer of ice.

The present invention consists of a permanent chemical surface treatment of the substrate (e.g. metal such as Al, steel, or polymer, typically PU (Polyurethane) based protective coatings, or oxidable ceramics such as oxide or nitride materials) with a long chain polysaccharide or a mixture of long chain polysaccharides, chemically anchored on the substrate with a non-hydrolysable bond in environmental conditions. The polysaccharide layer is made of interwoven polysaccharide chains forming a dense hygroscopic film. This water swollen hydrophilic layer forms a lubricant interface in which water remains liquid. Any ice formed on top of this layer has then a reduced adhesion strength and can be shed with a lower energy using a standard deicing system (e.g. an electrothermal de-icer or mechanical or pneumatic de-icer which may help the layer of ice to glide on the surface of the outdoor equipment) or with the natural heat generated by the activity of the outdoor equipment. These coatings can be very useful for any system equipped with a deicer in order to reduce the power consumption, such as aircraft, wind turbines and solar panels.

The invention concerns a method for anchoring permanently in normal conditions, advantageously by covalent bonding, the layer of polysaccharide on the surface of the equipment. This is achieved by coupling a layer of linkers on the substrate, said linkers being bi-functional and comprising:
  a first reacting group able to couple with the substrate in a stable way in environmental conditions, and
  a second reacting group able to generate a covalent bond stable in environmental conditions with polysaccharides.
"stable" includes namely stability towards water in environmental conditions (without external means for modifying Temperature, Pressure and pH). Temperature should be considered as comprised between −85° C./+55° C.

As illustrated on FIG. 1, the method of treatment according to the invention comprises the steps of:
  coupling said linkers on at least an area of the equipment to obtain a layer of linkers coupled in a stable way in environmental conditions with the substrate,
  making react some polysaccharides on the linkers layer to bind them with a bond stable in environmental conditions with the second reacting group of the linkers and forming a layer of polysaccharides on the layer of linkers.

Typically, the adhesion promoter contains silicate groups that form Si—O—X oxygen bridges with the substrate, X being an atom of the substrate. Typically, the substrates are any substrate that can be activated to form OH functions at the surface. The substrate can be activated by methods such as solvent cleaning and water washing, $O_2$ plasma treatment or even mechanical abrasion. The adhesion promoter is deposited either by a vapour deposition method or a liquid spreading process (e.g. dipping, spin-coating, spraying).

The linker may contain azide reactive chemical functions. Under UV irradiation, azide groups form highly reactive nitrene functions, which have a high affinity to CH or NH groups from neighboring polysaccharide chains. The layer of polysaccharide is sufficiently transparent to the UV wavelengths, so that the azide UV-activation is highly efficient. They then form non-hydrolysable bonds in environmental conditions between the polysaccharide chains and the substrate.

The convenient polysaccharides are uncharged with a chain long enough to form a dense layer (M>>1000, preferably >10000 g·mol$^{-1}$). Polysaccharides should be here understood as polymers with more than 5 monosaccharides. Typically, the polysaccharide can be chosen among the carrageenan, agar-agar, cellulose, chitin, mannan, dextran, starch, glycogen, amylopectin, inulin, graminan, levan, callose, laminarin, xylan and their derivatives. It is possible to use one polysaccharide or a mixture thereof. These polysaccharides are preferably dispersible in water, so to form a coatable paint composed of non-toxic chemicals only.

Thus, the deposition of the layer of linkers is followed by the deposition of the aqueous polysaccharide dispersion, using liquid deposition processes (e.g. brushing, blading, bar-coating, spraying). The covalent grafting is finally obtained by a UV irradiation. Non-grafted polysaccharide chains may be removed by water cleaning.

Example

The substrate is a polyurethane based coating obtained by deposition of commercial formulations: Aerowave 5001 on an Aerowave 2002 primer from Akzo Nobel; Alexit ClearCoat 411-14 crosslinked with hardener 406-85 and activator 901-72 from Mankiewicz; HS Decklack 6D811 crosslinked with hardener Bergodur 7D810 from Bergolin. This kind of substrates typicallycovers the aircraft wings.

The polymeric substrate is first mechanically activated using an $O_2$ plasma treatment. The activated substrates are then dipped for 30 minutes in an adhesion promoter ethanolic solution (HVE256-3-1 supplied by SuSoS AG, Switzerland). Meanwhile, i-carrageenan (type II from Sigma-Aldrich GmbH, Switzerland) or starch (Sigma-Aldrich GmbH, Switzerland) powders are dispersed in deionised water at a concentration of 50 mg·cm$^{-3}$. After rinsing the adhesion promoter solution with ethanol, the polysaccharide aqueous dispersions were brushed on the samples. The polysaccharide grafting on the adhesion promoter is UV-activated with a UV-C lamp for 2 minutes. Then, the samples were rinsed with water to remove the non-cross linked polysaccharide chains.

The treated surfaces were analysed through the wettability changes of the surfaces and were therefore characterized by measuring the contact angle of sessile 5 μL water droplets deposited on the sample, using a Drop Shape Analysis System DSA10 provided by Krüss (Hamburg, Germany).

The different deposition steps were analysed by water contact measurements. Indeed, all layers can be distinguished by their water wettability. The commercial coatings are mainly hydrophobic (static water contact angles in the 80-120° range). The adhesion promoter layer has a water contact angle around 45°. The starch or carrageenan layers have a pronounced hydrophilic character, since the water contact angles are homogeneously measured below 10°. These wettability measurements confirm that the coated samples are fully covered by the polysaccharide layer.

The starch coated Alexit samples have been validated by a test in an icing wind tunnel. When installed on a model equipped with an electrothermal system, the surface is first heated and then progressively cooled down to determine the limit temperature to get ice free conditions. The system is able to measure the corresponding power consumed by a de-icer system equipping the substrate. A significant power reduction of the electrothermal de-icer has been measured to avoid ice formation between the starch coated and the uncoated sample: −62% (25° C. instead of 90° C.) at −7° C. and −12% (90° C. instead of 130° C.) at −12° C.

In addition, resistance to wiping, temperature variations (in the +50/−30° C. range), and to different solvents has been demonstrated. More specifically, the coatings are resistant to water (at least in the pH 3-9 range), ethanol, glycol and to commercial de-icing fluids (e.g. Kilfrost, Zestron and Extreme Simple green).

Thus, it is obtained a treated surface on which a hygroscopic layer is chemically linked, said link resisting to environmental conditions without any toxic compound. Said hygroscopic layer allows water to remain liquid to temperatures down to −20/−25° C. Any formation of ice can be easily removed by a de-icing system, limiting any accumulation of ice and strongly reducing energy consumption of the de-icing system.

Furthermore, the layer of polysaccharides can be a basis for immobilizing some enzymes on the substrate. Suitable enzymes can be chosen in order to degrade organics and/or insects residues contaminating the surface of the substrate. Examples of suitable enzymes can be proteases, lipases, chitinases. Thus, the method described above can be completed by a further step of immobilizing some enzymes in the polysaccharides layer, possibly by means of a second linker. As for anti-icing action, the layer of polysaccharides makes easier the gliding of organics on the substrate, after partial degradation by the enzymes. This double effect makes the surfaces of the equipment easier to clean up and helps to keep a laminar flow on the aircraft wings.

What is claimed is:

1. A method of treatment of outdoor equipment for reducing ice adhesion on said device, said outdoor equipment defining a substrate on which a layer of linkers is intended to be coupled, said linkers being bi-functional and comprising:
    a first reacting group able to couple in a stable way in environmental conditions with the substrate, and
    a second reacting group able to generate a covalent bond stable in environmental conditions with polysaccharides,
said method comprising the steps of:
    coupling said linkers on at least an area of the equipment to obtain a layer of linkers coupled stably in environmental conditions with the substrate,
    making react some polysaccharides on the layer of linkers to bind them with a covalent bond stable in environmental conditions with the second reacting group of the linkers and forming a layer of polysaccharides on the layer of linkers,
wherein the linker contains azide functions.

2. The method of claim 1, comprising a step of activating the substrate promoting the coupling of the linkers.

3. The method of claim 1, wherein the layer of linkers is deposited by a vapour deposition method or by a liquid spreading process.

4. The method of claim 2, wherein the layer of linkers is deposited by a vapour deposition method or by a liquid spreading process.

5. The method according to claim 1, wherein the layer of polysaccharide is deposited by a step of liquid deposition process of an aqueous solution of polysaccharide dispersion, followed by a step of UV irradiation to graft covalently the polysaccharides on the linkers.

6. The method according to claim 1, wherein the polysaccharide has a Molar mass $M>1000$ $g \cdot mol^{-1}$.

7. The method of claim 5, wherein the polysaccharide has a Molar mass $M>1000$ $g \cdot mol^{-1}$.

8. The method of claim 7, wherein the polysaccharides are of one or several types chosen among carrageenan, agar-agar, cellulose, chitin, mannan, dextran, starch, glycogen, amylopectin, inulin, graminan, levan, callose, laminarin, xylan and their derivatives.

9. The method according to claim 1, wherein the polysaccharide has a Molar mass $M>10000$ $g \cdot mol^{-1}$.

10. The method of claim 5, wherein the polysaccharide has a Molar mass $M>10000$ $g \cdot mol^{-1}$.

* * * * *